(12) United States Patent
Ragouzis

(10) Patent No.: US 6,354,355 B1
(45) Date of Patent: Mar. 12, 2002

(54) FLEXIBLE WINDOW TETHER SYSTEM

(76) Inventor: Andrew N. Ragouzis, 4398 West Pine Blvd., No. 308, Saint Louis, MO (US) 63108

( * ) Notice: Subject to any disclaimer, the term of this patent is extended or adjusted under 35 U.S.C. 154(b) by 0 days.

(21) Appl. No.: 09/779,492

(22) Filed: Feb. 9, 2001

(51) Int. Cl.[7] .................................................. B60J 1/00
(52) U.S. Cl. ................................ 160/368.1; 296/146.2; 24/300
(58) Field of Search ........................ 160/368.1, 354, 160/349.1, 349.2, 329, 402, 403, 405, 399, 389; 296/146.2, 146.16, 146.15, 138; 24/302, 298, 300, 265 AL

(56) References Cited

U.S. PATENT DOCUMENTS

| | | | |
|---|---|---|---|
| 1,457,685 A | 6/1923 | Avey | |
| 2,840,412 A | * 6/1958 | Lancaster | 24/300 |
| 3,441,037 A | 4/1969 | Transeau | |
| 3,913,598 A | 10/1975 | Glutting, Jr. et al. | |
| 5,035,558 A | * 7/1991 | Prosen | 24/300 |
| 5,197,166 A | 3/1993 | Meier et al. | |
| 5,417,273 A | 5/1995 | Bamonte | |
| 5,440,790 A | * 8/1995 | Chou | 24/302 |
| 5,542,156 A | 8/1996 | Oglesby | |
| 6,036,256 A | 3/2000 | Hilliard et al. | |

* cited by examiner

Primary Examiner—David M. Purol
(74) Attorney, Agent, or Firm—Stephen R. Greiner

(57) ABSTRACT

A tethering system for a flexible window of a land vehicle. The system includes a number of releasable fastener portions secured to both a flexible window and the frame supporting the window. A number of anchors may be releasably joined to any of the releasable fastener portions. An elastic cord connects the anchors together so as to assist a user in opening the window and prevent the window from flapping in a wind. The length of the cord may be adjusted by way of slide anchors.

5 Claims, 4 Drawing Sheets

FLEXIBLE WINDOW TETHER SYSTEM

FIELD OF THE INVENTION

The present invention relates generally to land vehicles and, more particularly, to backstays for flexible window panels or curtains used therewith.

BACKGROUND OF THE INVENTION

Many land vehicles possess a "soft top," a flexible structure that, if desired, can be folded back for driving in fair weather. One example of such a vehicle is the Jeep® Wrangler®, a popular truck. For extra light and ventilation, the soft top of the Wrangler® is provided with windows formed from of a sheets of flexible plastic. The windows are conveniently opened and closed by means of a zipper extending along the top and sides thereof. Unfortunately, these windows tend to flap about when left open while driving, making them something of a distraction and an annoyance to vehicle occupants. No provision has been made by the manufacturers of the Wrangler® or similarly equipped vehicles to restrain opened, soft top windows from movement.

Some have proposed replacing the flexible windows of a soft top with rigid panels capable of sliding within a rectangular frame. Although flapping and its attendant noise are reduced by these arrangements, they present their own problems. For one, they have been small in size so as to permit folding of the soft top, but driver visibility through the small panels is poor. Further, ventilation is minimal with the available, panel arrangements capable of being only partially opened. Finally, the available panel arrangements are expensive, limiting their commercial acceptance.

SUMMARY OF THE INVENTION

In light of the problems associated with the windows provided in soft tops, it is a principal object of the invention to provide a system capable of restraining an opened window in the soft top of a land vehicle to provide a safe and quiet ride for vehicle occupants. The preferred system also assists a user in opening a flexible window. Soft tops in existing vehicles may be easily retrofit with the system and the system can be factory-installed in new vehicles.

It is an object of the invention to provide improved elements and arrangements thereof in a flexible window tether for the purposes described which is lightweight in construction, inexpensive to manufacture, and is dependable in use.

Briefly, the window tether system in accordance with this invention achieves the intended objects by featuring a frame with an opening and a zippered window for closing the opening. A number of releasable fastener portions are affixed to the window adjacent the zipper and to the frame. A tether releasably connects the fastener portions on the window to those on the frame. The tether includes an elastic cord having ends that are folded back upon themselves to form a pair of loops. Cord closures are secured to the ends of the cord so that the loops can be adjusted in length. One anchor is attached to the cord between the loops and carries a releasable fastener portion for mating with any one of the fastener portions on the window. Another pair of anchors is attached to the loops in the cord, each carrying a releasable fastener portion for mating with the fastener portions on the frame.

The foregoing and other objects, features and advantages of the present invention will become readily apparent upon further review of the following detailed description of the preferred embodiment as illustrated in the accompanying drawings.

BRIEF DESCRIPTION OF THE DRAWINGS

The present invention may be more readily described with reference to the accompanying drawings, in which.

Similar reference characters denote corresponding features consistently throughout the accompanying drawings.

DETAILED DESCRIPTION OF THE PREFERRED EMBODIMENT

Figure 1:
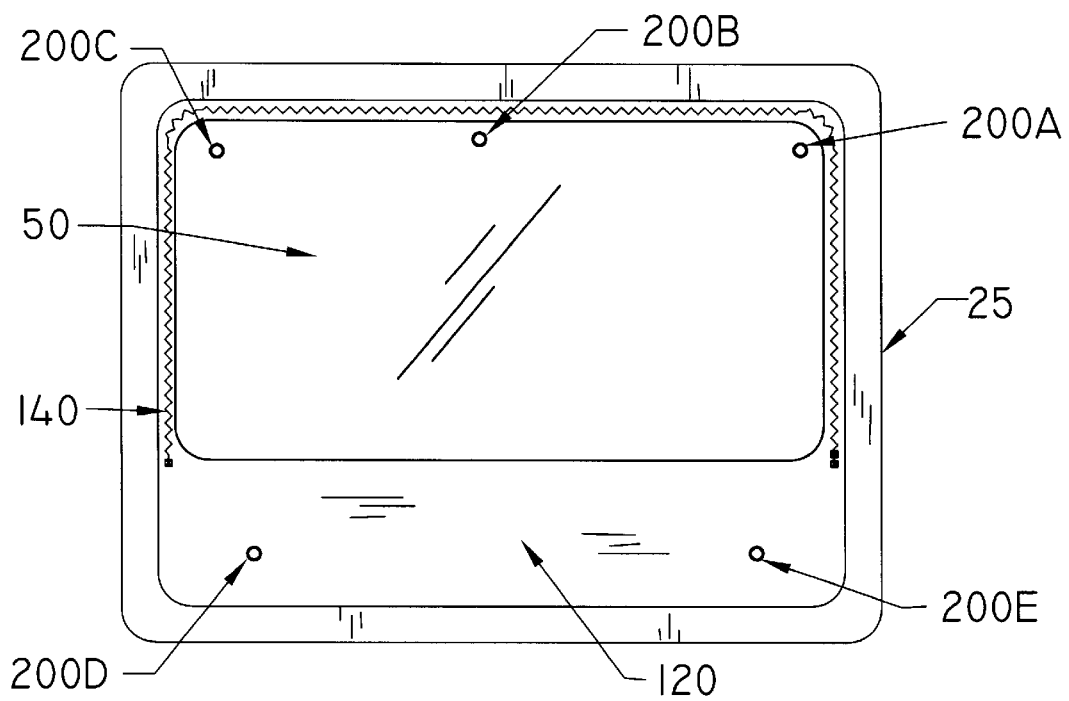
FIG. 1 is a side view of a flexible window assembly for a land vehicle in accordance with the present invention.
Figure 2:
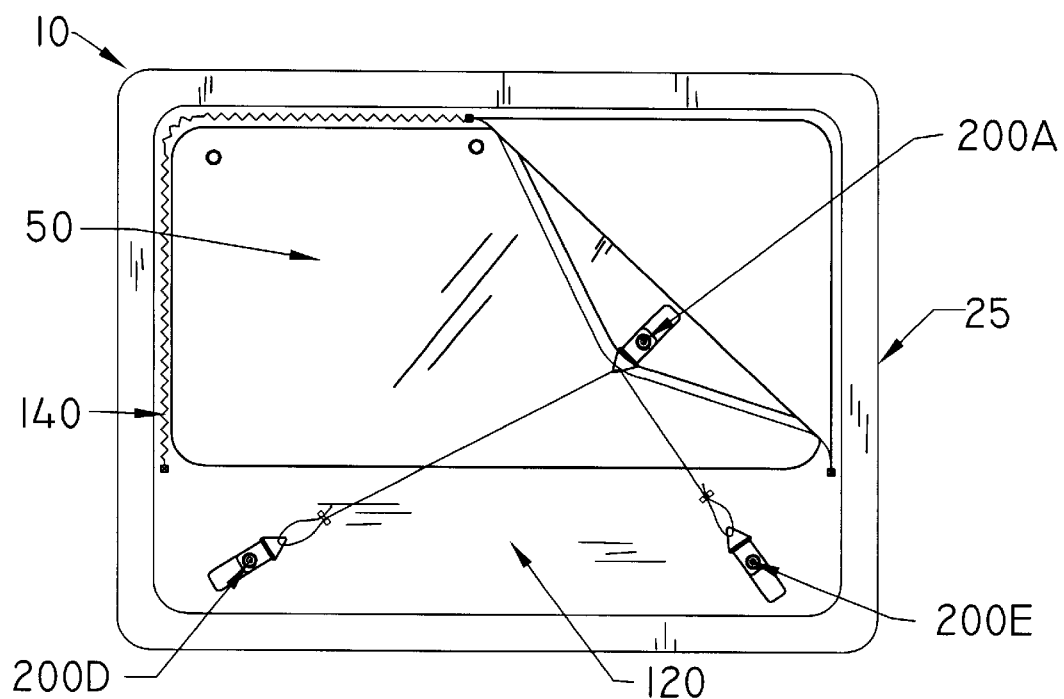
FIG. 2 is a side view of the assembly of FIG. 1 with the flexible window therein being partially opened and retained in an open position by a tether in accordance with the present invention.
Figure 3:
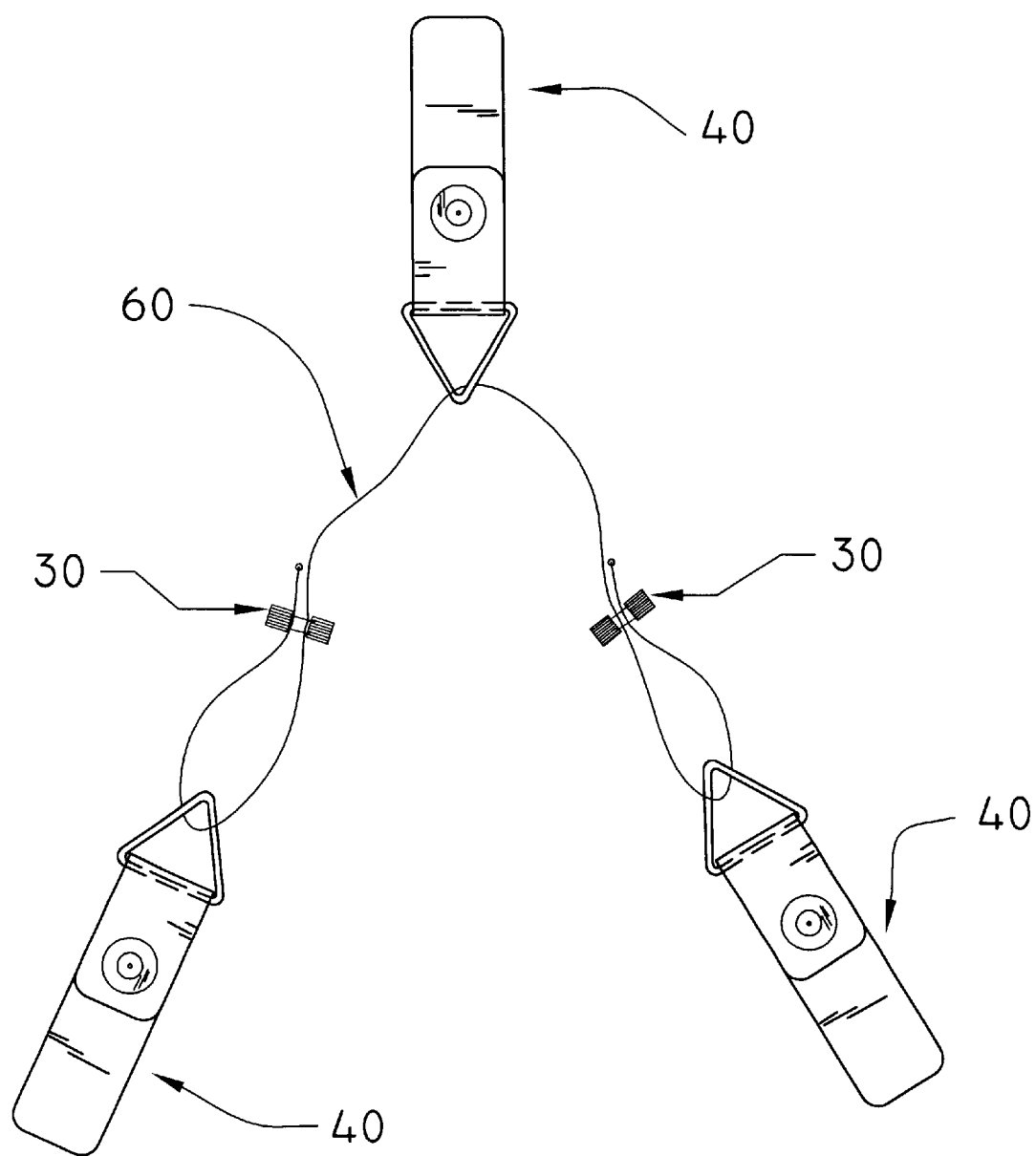
FIG. 3 is a top view of a tether, enlarged to reveal details thereof.
Figure 4:
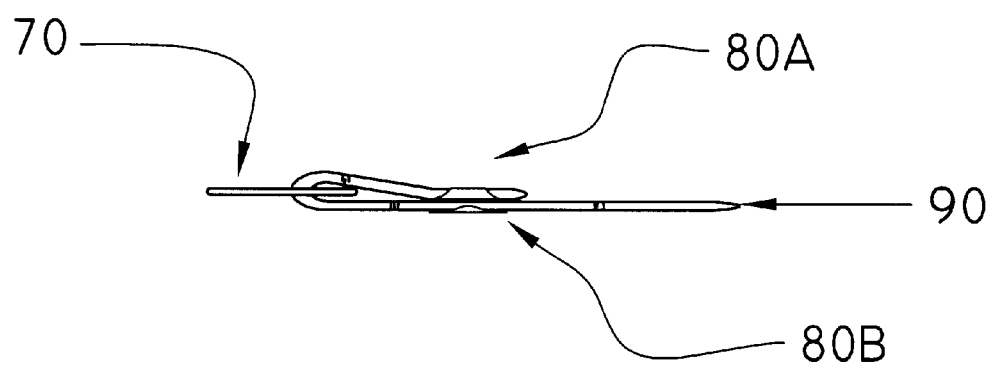
FIG. 4 is an enlarged side view of a tether anchor.
Figure 5:
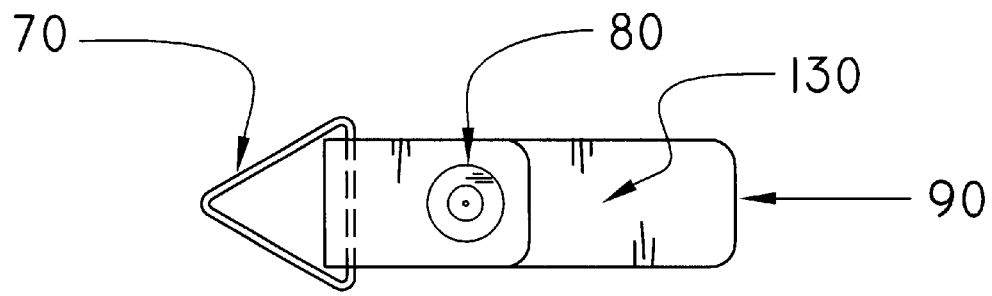
FIG. 5 is an enlarged top view of a tether anchor.

A window assembly of the type shown in U.S. Pat. No. 6,036,256, issued to Michael Hilliard et al and incorporated for all purposes herein, is illustrated at 10. Window assembly 10 includes a flexible, plastic window 50 affixed at its bottom to fabric frame 25. A zipper 140, however, extends along the top and sides of window 50. Movement of a zipper slide 145 along the length of zipper 140 permits window 50 to be progressively opened. In FIG. 2, window 50 is shown in a partially opened configuration so that a portion thereof is folded back upon the remainder of window 50 to form a vent opening in assembly 10. A tether 55 prevents the folded-back portion of window 50 from flapping in a strong wind.

Tether 55 includes an elastic cord 60 carrying three anchors 40 adapted for fastening to window 50 and frame 25. The ends of cord 60 are looped back upon themselves and secured in place by a pair of cord closures 30 like those illustrated in U.S. Pat. No. 5,197,166 issued to Terrence P. Meier et al and incorporated for all purposes herein. The lengths of the looped ends and, hence, the usable length of cord 60 may be adjusted by varying the position of cord closures 30 on cord 60.

Each anchor 40 includes a strip of flexible webbing 90 that is folded back upon itself so as to grasp a triangular ring 70 in the resulting loop. Sandwiching the overlapping portions of webbing 90 between a releasable fastener portion 80A and its backing plate 80B permanently closes the loop and forms a pull tab 130 from webbing 90 with which each anchor 40 can be manipulated. As shown, a pair of anchors 40 are located at the ends of cord 60 and a third anchor 40 is positioned at the middle of cord 60, cord 60 extending through each ring 70.

To permit the attachment of tether 55, releasable fastener portions 200A, 200B and 200C are affixed along the top of window 50 and releasable fastener portions 200D and 200E are affixed to the bottom portion 120 of frame 25. Preferably, fastener portions 200A–200E are "female" portions of a conventional snap-type fastener adapted to releasably mate with fastener portions 80A that are "male" portions of the same snap-type fastener. Of course, other releasable fasteners, such as hook-and-loop material, buckles, and buttons, could be substituted for snap-type fasteners but known drawbacks make them less desirable in this particular application.

Use of tether 55 is straightforward. First, anchors 40 at the ends of cord 60 are attached by their fastener portions 80A to fastener portions 200D and 200E. Then, anchor 40 at the middle of cord 60 is attached by its fastener portion 80A to one of fastener portions 200A, 200B or 200C on window 50 at a location where window 50 will be folded back upon itself. (Note: fastener portion 200A was selected in FIG. 2.) Next, window 50 is opened by moving slide 145 to a desired location along zipper 140 thereby forming a folded-back portion. Tension is applied to the folded-back portion by moving cord closures 30 along the length of cord 60. The tension applied to fastener portion 200A is directed in two different directions along cord 60 to fastener portions 200D and 200E ensuring that the folded back portion will remain stable under all wind conditions. Flapping of the folded-back portion while the associated vehicle is moving is a thing of the past.

While the invention has been described with a high degree of particularity, it will be appreciated by those skilled in the art that modifications may be made thereto. Therefore, it is to be understood that the present invention is not limited to the sole embodiment described above, but encompasses any and all embodiments within the scope of the following claims.

I claim:

1. A flexible window tether system, comprising:
   a window assembly including:
      a frame with an opening therein;
      a flexible window having a top, bottom, and opposed sides, the bottom of said window being affixed to said frame, and said window being adapted to close said opening;
      a zipper extending along said top and opposed sides of said window and said opening for releasably fastening said top, bottom, and opposed sides of said window to said frame;
      a plurality of first releasable fastener portions affixed to the top of said window;
      a plurality of second releasable fastener portions affixed to said frame beneath said opening therein; and,
   a tether including:
      an elastic cord having opposed ends being folded back upon themselves so as to form a pair of loops;
      a pair of cord closures each being secured to a respective one of said opposed ends so that each of said loops can be selectively adjusted in terms of length; and,
      a first anchor slidably attached to said cord between said loops, said first anchor carrying a third releasable fastener portion adapted to mate with, and releasably attach to, a respective one of said first releasable fastener portions; and,
      a pair of second anchors slidably attached to said loops in said cord, each of said second anchors carrying a fourth releasable fastener portion adapted to mate with, and releasably attach to, a respective one of said second releasable fastener portions.

2. The flexible window tether system according to claim 1 wherein said first, second, third and fourth releasable fastener portions are snap-type fastener portions.

3. A flexible window tether system, comprising:
   a window assembly including:
      a frame with an opening therein;
      a flexible window having a top, bottom, and opposed sides, the bottom of said window being affixed to said frame, and said window being adapted to close said opening;
      a zipper extending along said top and opposed sides of said window and said opening for releasably fastening said top, bottom, and opposed sides of said window to said frame;
      a plurality of first releasable fastener portions affixed to the top of said window;
      a plurality of second releasable fastener portions affixed to said frame beneath said opening therein; and,
   a tether including:
      an elastic cord having opposed ends being folded back upon themselves so as to form a pair of loops;
      a pair of cord closures each being secured to a respective one of said opposed ends so that each of said loops can be selectively adjusted in terms of length; and,
      a first anchor slidably attached to said cord between said loops, said first anchor including:
         a first strip of flexible webbing being folded back upon itself so as to form a first circle;
         a first ring grasped by said first circle in said first strip of flexible webbing; and,
         a third releasable fastener portion affixed to said first strip of flexible webbing adjacent said first ring, said third releasable fastener portion being adapted to mate with, and releasably attach to, a respective one of said first releasable fastener portions; and,
      a pair of second anchors slidably attached to said loops in said cord, each of said second anchors including:
         a second strip of flexible webbing being folded back upon itself so as to form a second circle;
         a second ring grasped by said second circle in said second strip of flexible webbing; and,
         a fourth releasable fastener portion affixed to said second strip of flexible webbing adjacent said second ring, said fourth releasable fastener portion being adapted to mate with, and releasably attach to, a respective one of said second releasable fastener portions.

4. The flexible window tether system according to claim 1 wherein said first, second, third and fourth releasable fastener portions are snap-type fastener portions.

5. A tether, comprising:
   an elastic cord having opposed ends being folded back upon themselves so as to form a pair of loops;
   a pair of cord closures each being secured to a respective one of said opposed ends so that each of said loops can be selectively adjusted in terms of length; and,
   a plurality of anchors slidably attached to said cord with a pair of said anchors being located on said loops and another of said anchors being located therebetween, each of said anchors including:
      a strip of flexible webbing being folded back upon itself so as to form a circle;
      a ring grasped by said circle in said webbing; and,
      a releasable fastener portion affixed to said webbing adjacent said ring.

* * * * *